US011836666B2

(12) United States Patent
Kilic

(10) Patent No.: US 11,836,666 B2
(45) Date of Patent: Dec. 5, 2023

(54) IDENTIFYING SCRIPT ERRORS IN AN ONLINE RETAIL PLATFORM AND QUANTIFYING SUCH ERRORS

(71) Applicant: Content Square SAS, Paris (FR)

(72) Inventor: Ali-Firat Kilic, Juvisy-sur-Orge (FR)

(73) Assignee: Content Square SAS, Paris (FR)

(*) Notice: Subject to any disclaimer, the term of this patent is extended or adjusted under 35 U.S.C. 154(b) by 0 days.

(21) Appl. No.: 17/716,650

(22) Filed: Apr. 8, 2022

(65) Prior Publication Data
US 2022/0245553 A1    Aug. 4, 2022

Related U.S. Application Data

(63) Continuation of application No. 16/919,765, filed on Jul. 2, 2020, now Pat. No. 11,328,241.

(51) Int. Cl.
| | |
|---|---|
| *G06Q 10/0639* | (2023.01) |
| *G06F 11/34* | (2006.01) |
| *G06F 11/30* | (2006.01) |
| *G06Q 30/0242* | (2023.01) |

(52) U.S. Cl.
CPC ..... *G06Q 10/06393* (2013.01); *G06F 11/302* (2013.01); *G06F 11/3409* (2013.01); *G06Q 30/0246* (2013.01)

(58) Field of Classification Search
None
See application file for complete search history.

(56) References Cited

U.S. PATENT DOCUMENTS

| | | |
|---|---|---|
| 7,685,273 B1 | 3/2010 | Anastas et al. |
| 7,822,662 B2 | 10/2010 | Guzik et al. |
| 8,065,410 B1 | 11/2011 | Breen et al. |
| 8,677,188 B2 | 3/2014 | Eickmeyer et al. |
| 10,887,201 B2 | 1/2021 | Park |

(Continued)

FOREIGN PATENT DOCUMENTS

WO    WO-2005015404 A2    2/2005

OTHER PUBLICATIONS

Vagif "Performance inplication of Exceptions in .Net", Sep. 2005, Code Project, pp. 1-7 (Year: 2005).*

(Continued)

*Primary Examiner* — Romain Jeanty
(74) *Attorney, Agent, or Firm* — Schwegman Lundberg & Woessner, P.A.

(57) ABSTRACT

A system and method for quantifying impact of script error exceptions on performance of an online retail platform. A method includes selecting at least one performance metric for a webpage, wherein the selected performance metric has an impact due to at least one script error exception encountered on the webpage visited by a first user device; retrieving a normal value for each of the at least one selected performance metric for the webpage visited by a second user device; retrieving an abnormal value for each of the at least one selected performance metric for the webpage visited by the second user device; comparing the abnormal value to the normal value of a respective selected performance metric; and determining a performance impact score based on the comparison, wherein the performance impact score is indicative of a reduction in a performance metric of each of the least one selected performance metric.

20 Claims, 7 Drawing Sheets

(56) References Cited

U.S. PATENT DOCUMENTS

| | | | |
|---|---|---|---|
| 11,328,241 B2 | 5/2022 | Kilic | |
| 11,461,104 B2* | 10/2022 | Williams | G06F 9/3861 |
| 2004/0158429 A1 | 8/2004 | Bary et al. | |
| 2005/0177597 A1 | 8/2005 | Elmer | |
| 2011/0282716 A1 | 11/2011 | Fenstermaker et al. | |
| 2014/0208169 A1* | 7/2014 | Randhir | G06Q 10/06 714/45 |
| 2014/0310034 A1 | 10/2014 | Li et al. | |
| 2014/0324521 A1 | 10/2014 | Mun | |
| 2014/0358645 A1 | 12/2014 | Ehrman et al. | |
| 2015/0058077 A1 | 2/2015 | Buban et al. | |
| 2015/0332147 A1 | 11/2015 | Anastas et al. | |
| 2016/0098654 A1 | 4/2016 | Bhattacharjee et al. | |
| 2016/0162825 A1* | 6/2016 | Dan | G06Q 10/067 705/7.37 |
| 2019/0260818 A1 | 8/2019 | Ciabarra, Jr. | |
| 2020/0127904 A1 | 4/2020 | Kieviet et al. | |
| 2022/0004958 A1 | 1/2022 | Kilic | |

OTHER PUBLICATIONS

Ahm et al (Dashboard User Interface for Measuring Performance Metrics: Concept from Virtual Factory Approach), Jan. 2014, Proceedings of the 2014 International Conference on Industrial Engineering and Operations Management Bali, Indonesia, pp. 124-133 (Year: 2014).*

U.S. Appl. No. 16/919,765, filed Jul. 2, 2020, Identifying Script Errors in an Online Retail Platform and Quantifying Such Errors, U.S. Pat. No. 11,328,241.

"U.S. Appl. No. 16/919,765, Non Final Office Action dated Sep. 29, 2021", 11 pgs.

"U.S. Appl. No. 16/919,765, Notice of Allowance dated Mar. 29, 2022", 10 pgs.

"U.S. Appl. No. 16/919,765, Response filed Dec. 23, 2021 to Non Final Office Action dated Sep. 29, 2021", 15 pgs.

"International Application Serial No. PCT/IB2020/056271, International Search Report dated Mar. 15, 2021", 4 pgs.

"International Application Serial No. PCT/IB2020/056271, Written Opinion dated Mar. 15, 2021", 10 pgs.

Coby, "14 Important Website Performance Metrics You Should Be Analyzing", Website Performance Metrics, (Jun. 2017), 1-7.

Hossain, et al., "Web Test Integration and Performance Evaluation of E-Commerce Web Sites", International Journal of Computer Science and Information Security, (Sep. 2012).

* cited by examiner

IDENTIFYING SCRIPT ERRORS IN AN ONLINE RETAIL PLATFORM AND QUANTIFYING SUCH ERRORS

CLAIM OF PRIORITY

This application is a continuation of U.S. application Ser. No. 16/919,765, filed Jul. 2, 2020, which is hereby incorporated by reference in its entirety.

TECHNICAL FIELD

The disclosure generally relates to monitoring browsing activity and particularly to identifying script errors in an online retail platform.

BACKGROUND

The Internet is a collection of disparate computer systems which use a common protocol to communicate with each other. A common use of the Internet is to access World Wide Web (web) pages. Web pages are typically stored on a server and remotely accessed by a client over the Internet using a web browser.

A website is a collection of web pages. A website typically includes a home page and a hierarchical order of follow-on web pages that are accessible through the home page. The web pages are connected to each other using hypertext links. The links allow a user to browse web pages of a web site by selecting the links between the web pages. Distinct websites may be respectively identified by respective distinctly associated Internet domain names.

Scripts, such as JavaScript, are interpreted by a web browser when a webpage is loaded. A webpage may include a number of scripts. A script may run with errors, thereby disabling some of the functionality of the webpage. Such errors may be due to programming errors, unsupported architectures, and the like. Script execution errors, also referred to as exceptions, may be displayed on the webpage as an error message, such as "image cannot be loaded," or as indications by the web browser. However, a user has little to do with such errors, as the user is not required to perform any action.

As such, the errors are not reported to the developers or owners of the website in real-time. To encounter such errors, a developer may be required to test and debug every script on each computing platform, such as a browser type, a browser version, an operating system type, and the like. This is a tedious task, and with the rapid changes in websites, it may be an impractical task.

Furthermore, script errors may lead to loss of revenue, for example, in ecommerce websites, increased frustration for users interacting with a website, or both. For example, when a script-executed function for placing an item in a cart does not work, a conversion will not happen and the user will be frustrated.

It would therefore be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for quantifying impact of script error exceptions on performance of an online retail platform. The method comprises: selecting at least one performance metric for a webpage, wherein the selected performance metric has an impact due to at least one script error exception encountered on the webpage visited by a first user device; retrieving a normal value for each of the at least one selected performance metric for the webpage visited by a second user device; retrieving an abnormal value for each of the at least one selected performance metric for the webpage visited by the second user device; comparing the abnormal value to the normal value of a respective selected performance metric; and determining a performance impact score based on the comparison, wherein the performance impact score is indicative of a reduction in a performance metric of each of the least one selected performance metric.

Certain embodiments disclosed herein also include a non-transitory computer readable medium having stored thereon instructions for causing a processing circuitry to execute a process, the process comprising: selecting at least one performance metric for a webpage, wherein the selected performance metric has an impact due to at least one script error exception encountered on the webpage visited by a first user device; retrieving a normal value for each of the at least one selected performance metric for the webpage visited by a second user device; retrieving an abnormal value for each of the at least one selected performance metric for the webpage visited by the second user device; comparing the abnormal value to the normal value of a respective selected performance metric; and determining a performance impact score based on the comparison, wherein the performance impact score is indicative of a reduction in a performance metric of each of the least one selected performance metric.

Certain embodiments disclosed herein also include a system for quantifying impact of script error exceptions on performance of an online retail platform, comprising: a processing circuitry; and a memory, the memory containing instructions that, when executed by the processing circuitry, configure the system to: select at least one performance metric for a webpage, wherein the selected performance metric has an impact due to at least one script error exception encountered on the webpage visited by a first user device; retrieve a normal value for each of the at least one selected performance metric for the webpage visited by a second user device; retrieve an abnormal value for each of the at least one selected performance metric for the webpage visited by the second user device; compare the abnormal value to the normal value of a respective selected performance metric; and determine a performance impact score based on the comparison, wherein the performance impact score is indicative of a reduction in a performance metric of each of the least one selected performance metric.

BRIEF DESCRIPTION OF THE DRAWINGS

The subject matter of the disclosure is particularly pointed out and distinctly claimed in the claims at the conclusion of the specification. The foregoing and other objects, features, and advantages will become apparent and more readily appreciated from the following detailed description taken in conjunction with the accompanying drawings, in which:

DETAILED DESCRIPTION

Figure 1:
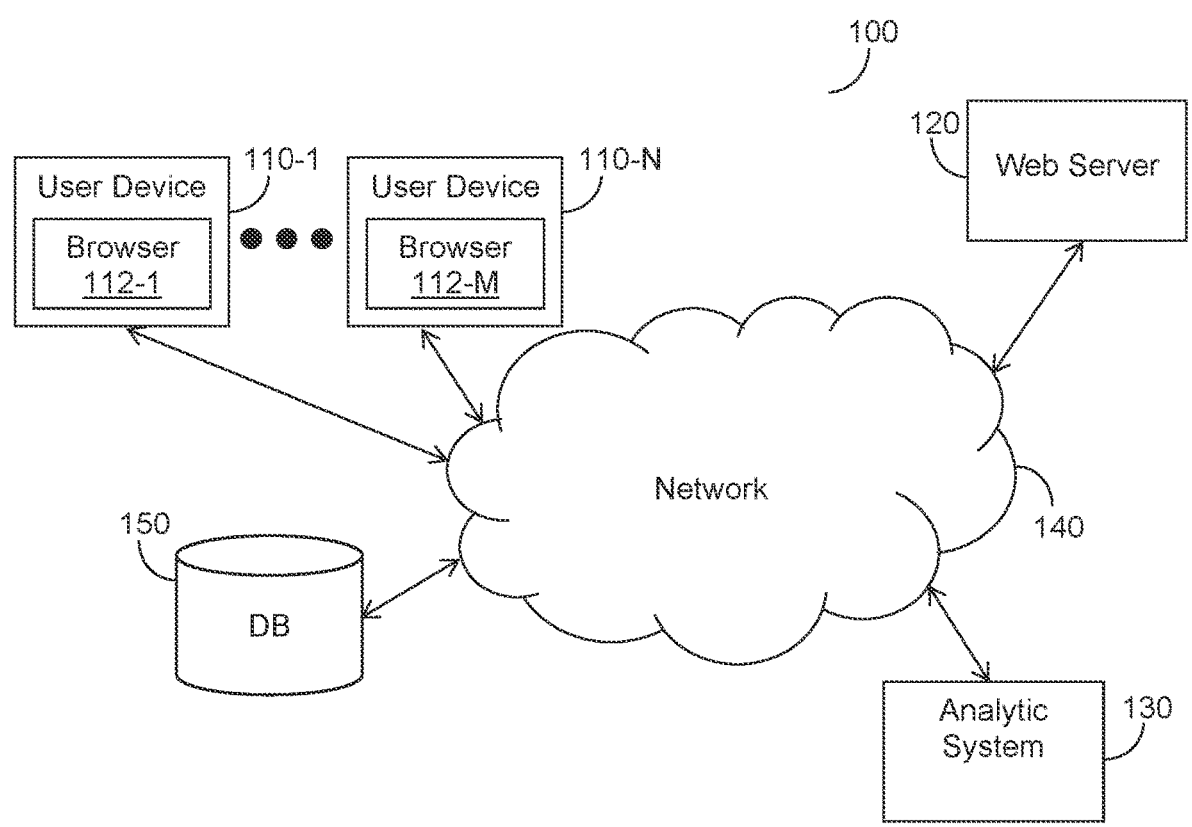
FIG. 1 shows a network diagram utilized to describe the various embodiments of the invention.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an example diagram of a network system 100 utilized to describe the various embodiments. The network system 100 includes one or more user devices, 110-1 through 110-N (hereinafter referred to as "user device" 110 or "user devices" 110), at least one web server 120, and an analytic system 130, all connected to a network 140. The analytic system 130 may be adapted to process and analyze at least script activity information provided by the user devices 110. The analytic system 130 is further configured to gather, process, and analyze engagement data related to the engagement of users of user devices 110 interacting with a website hosted by the web server 120. In an example embodiment, such a website includes an e-commerce website, i.e., any website that offers goods, services, or both.

The network 140 provides interconnectivity between the various components of the system. The network 140 may be, but is not limited to, a wireless, cellular or wired network, a local area network (LAN), a wide area network (WAN), a metro area network (MAN), the Internet, the worldwide web (WWW), similar networks, and any combination thereof. The network 140 may be a full-physical network, including exclusively of physical hardware, a fully-virtual network, including only simulated or otherwise virtualized components, or a hybrid physical-virtual network, including both physical and virtualized components. Further, the network 140 may be configured to encrypt data, both at rest and in motion, and to transmit encrypted, unencrypted, or partially-encrypted data. The network 140 may be configured to connect to the various components of the system 100 via wireless means such as, as examples and without limitation, Bluetooth long-term evolution (LTE), Wi-Fi, other, like, wireless means, and any combination thereof, via wired means such as, as examples and without limitation, ethernet, universal serial bus (USB), other, like, wired means, and any combination thereof. Further, the network 140 may be configured to connect with the various components of the system 100 via any combination of wired and wireless means.

A user device 110 may be any computing device allowing a user to at least download web-pages, display web-pages, and interact with web-pages. A user device 110 may be, but is not limited to, a smart phone, a tablet computer, a personal computer, a laptop computer, a netbook computer, an electronic reader, and the like. A user device may be installed with a web browser 112, such as Safari®, Firefox®, Internet Explorer®, Chrome®, and the like. The processor of the user device 110 runs an operating system that may include, without limitation, iOS®, Android®, Unix®, Windows®, and the like. It should be noted that the browser 112 may include any mobile application executable over the user device 110 and/or an extension of the browser 112. Such an application is typically downloaded from a central repository (not shown) which may be, for example and without limitation, AppStore® by Apple Computers®, Google® Play®, and the like.

The web server 120 can host a website accessed through a browser 112. The web server 120 may also execute an application that provides functionality and content to a mobile application executed over a user device 110. The teachings disclosed herein can be utilized to identify script errors, to quantify such errors, and to generate other analytics data that is based on scripts of either the web pages of a website displayed over a browser 112 or the content displayed over a mobile application. Without limiting the scope of the disclosed embodiment and merely for the sake of simplicity, the description hereinbelow will be made with reference to the browser 112. It should be further noted that the disclosed teachings are not limited to scripts retrieved from one server. The browser 112 can render display content retrieved from a plurality of servers, web servers, application servers, or any combination thereof.

Any webpage visited by a user device 110 and provided by the web server 120 includes a tracking tag. The tracking tag, when interpreted by a browser 112, executes a piece of code, such as a script, configured to track an interaction of a user with the web page. This includes a URL visited, any element in the page clicked on, or hovered over, by the user, and the like. In an embodiment, the tracking tag may be configured to capture, or otherwise intercept, script execution errors (hereinafter referred to as "error exceptions"). Each error exception is reported with the URL, a page on which the URL was executed, a line error, and a script name. As will be demonstrated below, a script can run without error on one browser, but may be run with errors on another browser.

The analytic system 130, depicted in detail with respect to FIG. 7, below, is a system configured to execute instructions, organize information, and otherwise process data. The analytic system 130 may be configured to execute the methods described hereinbelow, other, like, methods, and any combination thereof. As described with respect to FIG. 7, below, the analytic system 130 may include various processing, memory, networking, and other components allowing the analytic system 130 to execute instructions and provide data processing. The analytic system 130 may be implemented as physical hardware, as software virtualizing physical hardware, or as a combination of physical and virtualized components.

According to the disclosed embodiment, the analytic system 130 is configured to receive browsing activity from any user device, such as the user device 110, processing the tracking tag. In an embodiment, the browsing activity includes script exceptions, such as error exceptions, and interaction information of the user with any tracked webpage.

An error exception, such as an error message, may be, for example, an electronic notification that is generated by, for example, JavaScript, when an error occurs in the script that runs a web page using a certain browser. For example, when an error occurs, JavaScript stops and generates an error message. The error exception is indicative of a script error that is associated with at least one script of a first website. The first website may be, for example, a retail website, such as a Nike® website, an Amazon® website, and the like. The error exception may be received from at least one user device, such as the device 110-1, that browses through the first website. An error exception may include the script name generated the error, the error code line, and the URL. For example, when JavaScript is interpreted by Chrome®, a specific web browser, an error occurs. The error may indicate, for example, the name of the script that throws the error, i.e., generated the error, is JavaScript, the code line indicating that an "add to cart" button is not working properly, and the URL indicating the specific web page at which the error occurred. It should be noted that, upon identification of an error, the script, such as JavaScript, may create an error object that includes a name and message.

The interaction information of the browsing activity may include mouse movements, scrolling of web page, resizing of browser window, click events, keyboard use with any element of a webpage, and the like, as well as any combination thereof. The interaction information may further include, without limitation, information regarding page URL, referrer, load time, IP address, browser type, screen resolution, page views, and the like.

The interaction information may be processed by the system 130 to determine one or more performance metrics. Such metrics include, for example, a number of clicks made during the user's visit in the web page, a click rate, a conversion rate, and the like. The performance metrics determined for each website, webpage, or both are tracked by the analytic system 130 and may be saved in a database 150, connected to the network 140. In some embodiments, browsing activity that includes error exceptions is marked as abnormal performance metrics, while other metrics are marked as normal.

In an embodiment, the analytic system 130 is configured to aggregate error exceptions for each webpage, such as a URL, on a tracked website. The aggregation may be further based on, for example, a script name, a browser type, functions (i.e., error type), and the like. It should be noted that error exceptions are related to the same website. That is, error exceptions that are associated with a first website are aggregated separately from error exceptions that are associated with a second website. For example, fifty (50) error exceptions are received and aggregated by the analytic system 130. According to the same example, fifteen error exceptions indicate that the script is a JavaScript that runs on Safari® browser, that the error is that "BUY" button does not work properly (i.e., error type), and that the error occurs in a Timberland® website at the "mens-boots" web page, providing, for example, the specific URL indicating the specific web page at which the error occurred. According to the same example, 45 error exceptions indicate that the script is a JavaScript that runs on Chrome® browser, that the error is that the "add to cart" button does not work properly (i.e., error type), and that the error occurs in the Timberland® website at the "kids-sandals" web page, providing, for example, a specific URL indicating the specific web page at which the error occurred. According to the same example, 25 error exceptions indicate that the script is a JavaScript that runs on Chrome® browser, that the error is that images are not displayed properly (i.e., error type), and that the error occurs in a Timberland® website at the "womens-bestsellers" web page, providing, for example, a specific URL indicating the specific web page at which the error occurred. According to the same example, all fifty exceptions are aggregated based on their properties.

In an embodiment, the analytic system 130 is further configured to analyze the aggregated error exceptions to determine a performance impact score. The performance impact score indicates an impact level of aggregated error exceptions, for the same page, on at least one performance metric of the first website. As noted above, performance metric may be, for example, a conversion rate, a click-through rate, a number of pageviews, a cart abandonment rate, and the like.

In one embodiment, the analysis may include comparing at least one performance metric that is associated with at least one script, in which the at least one error exception was detected, to an identical performance metric of a plurality of scripts that do not demonstrate error exceptions. The performance impact score may be an integer number from "0" to "5", where "0" is the lowest score indicating that the at least one error exception, such as a script error, has no impact on one or more of the performance metrics, and where a performance impact score of "five" indicates the highest performance impact, i.e., a negative impact. For example, two hundred error exceptions may indicate that an "add to cart" button is not working properly in a specific web page at Amazon® website and that the conversion rate, an example of a performance metric that is associated with these two hundred visits is 0%. According to the same example, the analytic system 130 compares the 0% conversion rate, an example of a performance metric, that is associated with the scripts in which error occurred to a conversion rate, or other, identical performance metric, that is associated with scripts that do not demonstrate error exceptions, such as script errors. According to the same example, the conversion rate of the properly working code, such as code wherein no error exception is identified, may be 4.3% a four-and-a-half percent conversion rate, which may be which is a high conversion rate relative to comparable conversion rates, and, therefore, the performance impact score may be relatively high, such as 5, indicating that the impact of the error exception is high.

In an embodiment, the analytic system 130 is configured to determine, based on the result of the analysis, the performance impact score that is indicative of a level of impact of the at least one error exception on at least one performance metric of the first website.

In a further embodiment, the analytic system 130 is configured to determine a business impact score, indicating a business impact level of the at least one error exception based on the determined performance impact score or scores. The business impact score may be a ranking from "A" to "C," where "C" is the lowest score, indicating that a determined performance impact has no business impact, and where "A" indicates the highest business impact, such as a negative impact. For example, when a performance impact score of "5" has been determined with respect to 1,000 error exceptions collected form the same website, the business impact score, or ranking, may be "A." The determination of the business impact score may be achieved based on analysis of the determined performance impact score or scores.

In an embodiment, the analytic system 130 is configured to prioritize each of the at least one error exception based on the determined business impact score related thereto. That is, a first error exception, such as a script error exception indicating that a "buy" button is not working properly, may have a greater negative business impact than a second error exception, such as a script error exception indicating that the company's logo is not displayed properly. The process of prioritizing the error exceptions is described in greater detail below with respect to FIG. 4.

Figure 2:
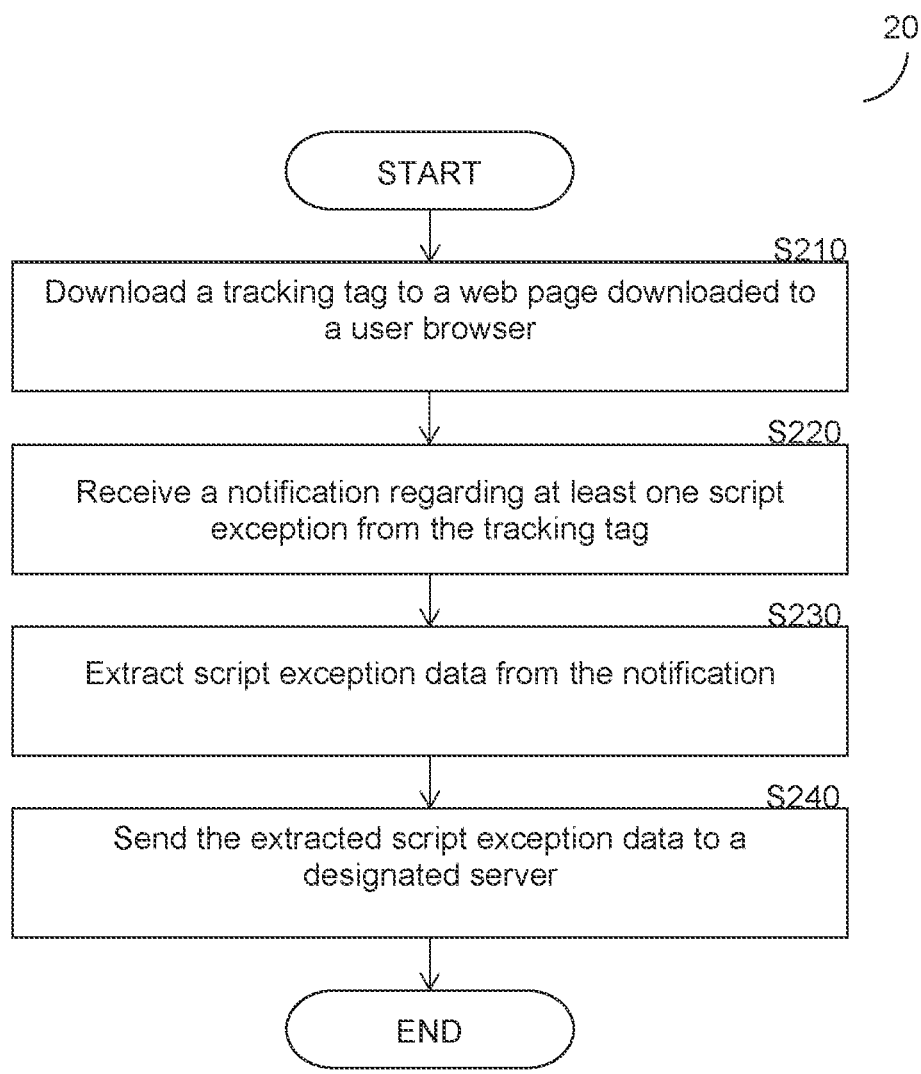
FIG. 2 is a flowchart illustrating a method for collecting script exceptions by a tracking tag according to one embodiment.

FIG. 2 is an example flowchart 200 of a method for collecting script error exceptions (hereinafter referred to as "error exceptions") and for sending the script error exceptions to a designated server, according to one embodiment.

At S210, a tracking tag, which may be implemented by or as a tracking script or the like, is downloaded to a web page that was downloaded to the browser that is utilized by the user device. The tracking tag may be part of the web page content retrieved from the web server or may be embedded in a mobile application. The downloaded tracking tag is saved in a tangible memory of the user device and executed thereon. In one embodiment, the tracking tag is realized as JavaScript. The tracking tag enables tracking and monitoring of script activity of one or more web pages of a website and, therefore, allows for determination of whether an error exception has been detected.

At S220, a notification regarding at least one error exception, such as script error exception, is captured by the tracking tag. The notification may be an electronic message the contains data, such as script error exception data, regarding one or more script error that occurred.

At S230, script error exception data is extracted from the notification. The script error exception data may include, for example, a script name, an error type, a URL at which the error occurred, and the like.

At S240, the script error exception data is sent over a network, such as the network 140, to a designated server, such as the analytic system 130, for further usage.

Figure 3:
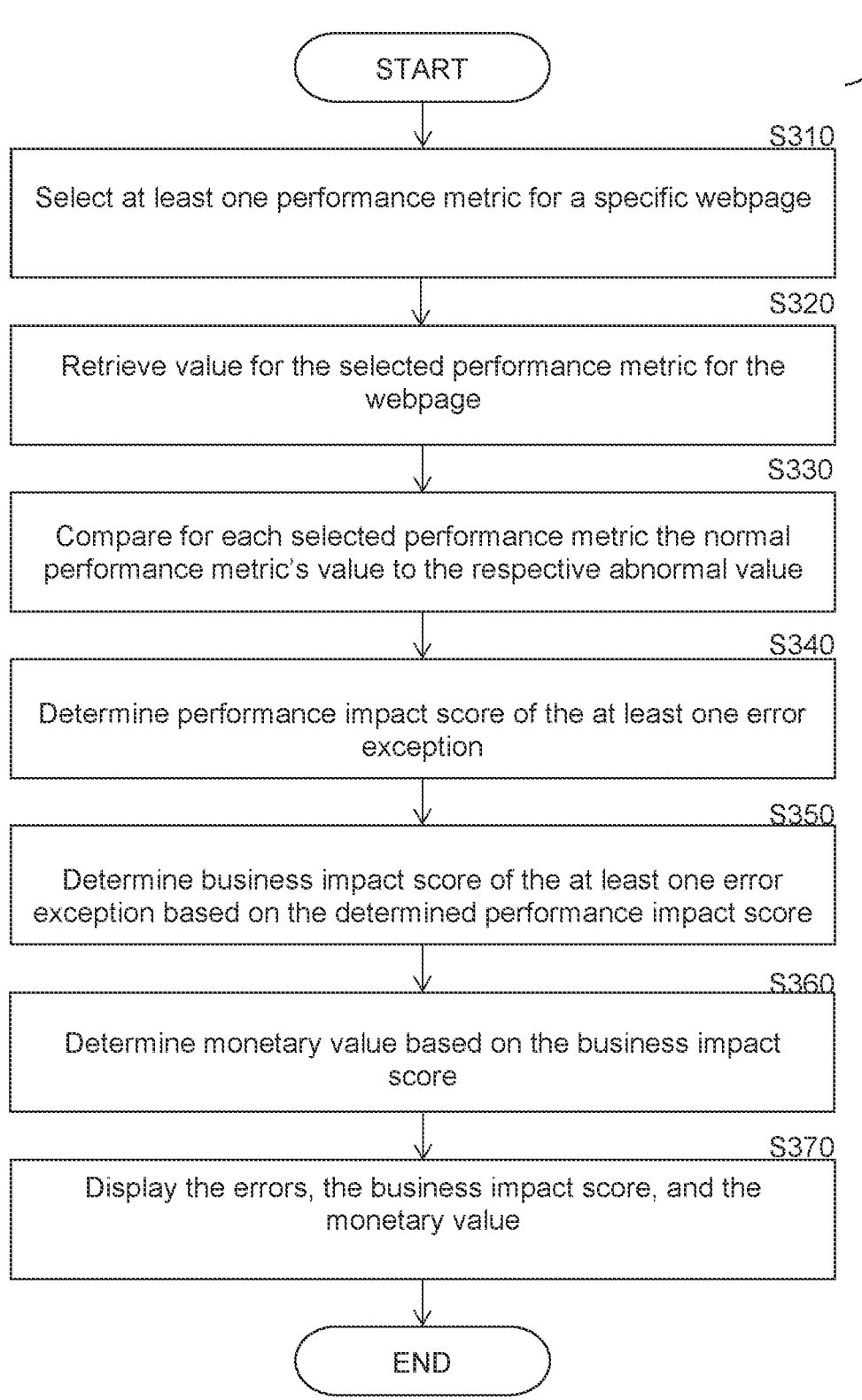
FIG. 3 is a flowchart illustrating a method for determining business impact of script errors according to one embodiment.

FIG. 3 shows an example flowchart 300 illustrating a method for analyzing aggregated script error exceptions (hereinafter referred to as "error exceptions"), and for determining one or more impacts of the script error exceptions, according to one embodiment. In an embodiment the method is performed by the analytic system 130.

At S310, at least one performance metric for a specific webpage is selected. The selected performance metric is to determine the impact of the error exception on this metric. For example, if the selected metric is a number of clicks on an "subscribe" element, the determination would be how the error exceptions reduce the number of clicks. Other examples for performance metrics include, without limitation, a conversion rate, a click-through rate, a number of pageviews, a cart abandonment, and the like.

At S320, the value for the selected performance metric for the webpage is retrieved from, for example, a database, such as the database 150 shown in FIG. 1. The performance metric's value is logged for one or more webpages where error exceptions have not occurred and one or more webpages where error exceptions occurred. The former represents a normal metric's value of a normal activity for the webpage, the website, or both, and the latter represents abnormal activity. For example, the webpage having a URL "myservices.com," includes a "subscribe" button for which a call-for-action for is rendered by an execution of script. The script may run without errors on a Chrome® browser but with errors on an Explorer® browser. As such, normal performance metric values, such as a number of clicks, will be logged for user access using the Chrome® browser, and abnormal performance metric values will be logged for user access using the Explorer® browser. The performance metrics' values are retrieved for each selected performance metric.

At S330, for each selected performance metric, the normal performance metric's value is compared to the respective abnormal value.

At S340, a performance impact score of the at least one error exception is determined. The performance impact score indicates an impact level of the at least one error exception on at least one performance parameter of a first website. The performance impact score may be an integer number from "0" to "5", where "0" is the lowest score indicating that the at least one error exception (e.g., such as a script error exception, has no impact on one or more of the performance metrics. A performance impact score of "5" indicates the highest performance impact, which may be, in an embodiment, usually a negative impact. As another example, the normal metric's value may be normalized to 100 and the abnormal metric's value may be a percentage of that normalized value. For example, if the number of clicks in a webpage that operates without errors is 1000 and the number of clicks on a page that operates with script errors is 200, the impact score would be two percent, 2% (e.g, or a 98% performance reduction).

At S350, a business impact score of the at least one error exception is determined based on the determined performance impact score. The business impact score indicates a business impact level of the at least one error exception based on the determined performance impact score or scores. As noted above, the business impact score may be a ranking from "A" to "C," where "C" is the lowest score indicating that determined performance impact has no business impact, and where "A" indicates the highest business impact, which may be, in some embodiments, usually a negative impact.

At S360, a monetary value is determined based on the business impact score. The monetary value may include loss of revenue due to error exceptions. For example, if the impact score is 2% reduction, a revenue reduction of 98% may also be demonstrated.

Figure 5:
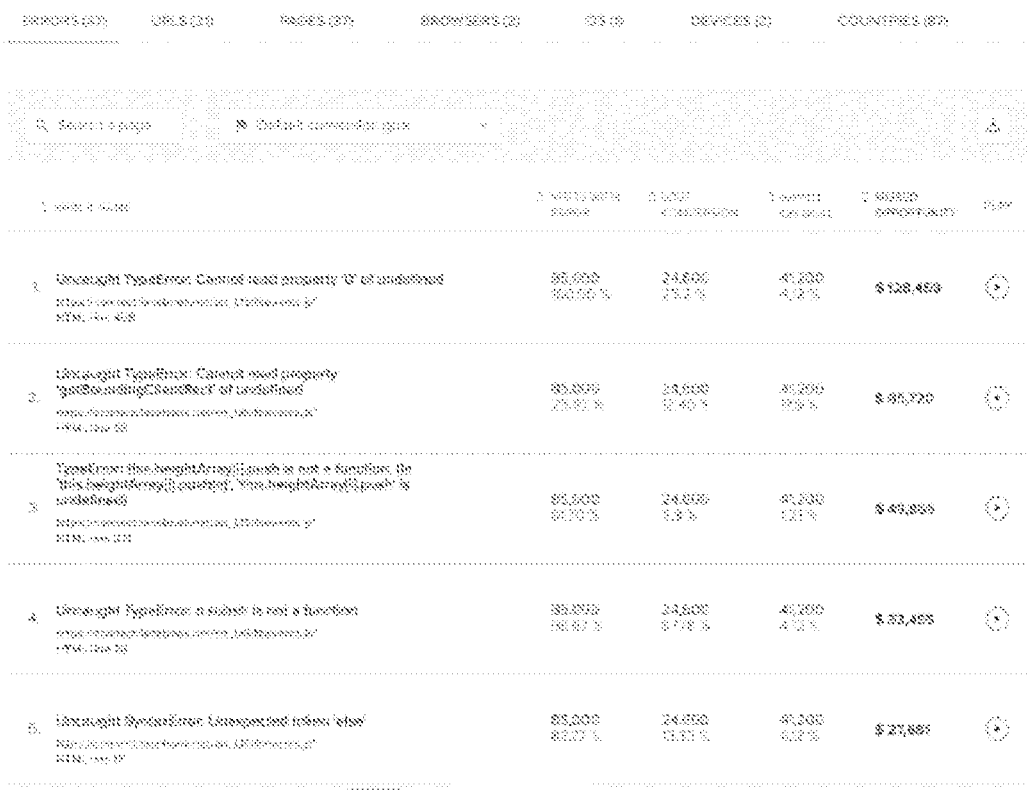
FIG. 5 is an example screenshot showing the displayed processed information on a first dashboard.
Figure 6:
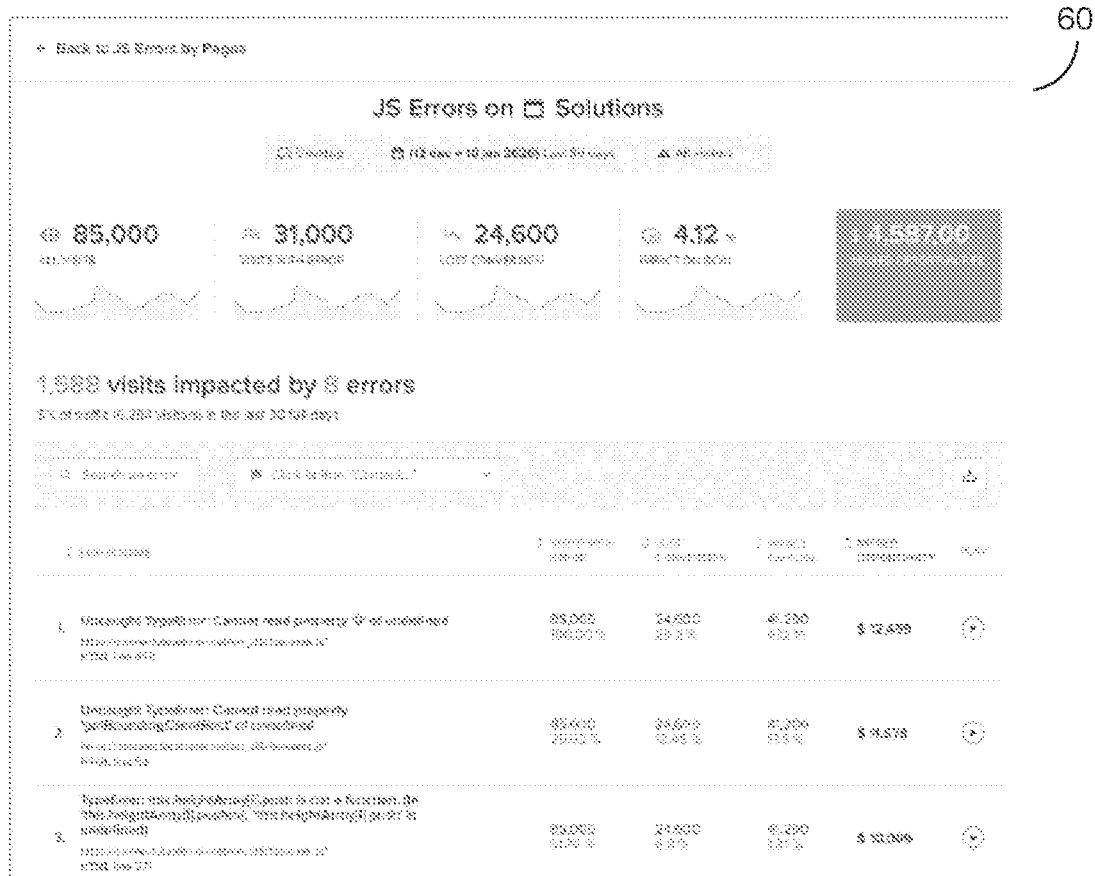
FIG. 6 is an example screenshot showing the displayed processed information on a second dashboard.

At S370, the errors, the business impact score, and the monetary value are displayed. An example screenshot showing the displayed information is shown in FIGS. 5 and 6.

Figure 4:
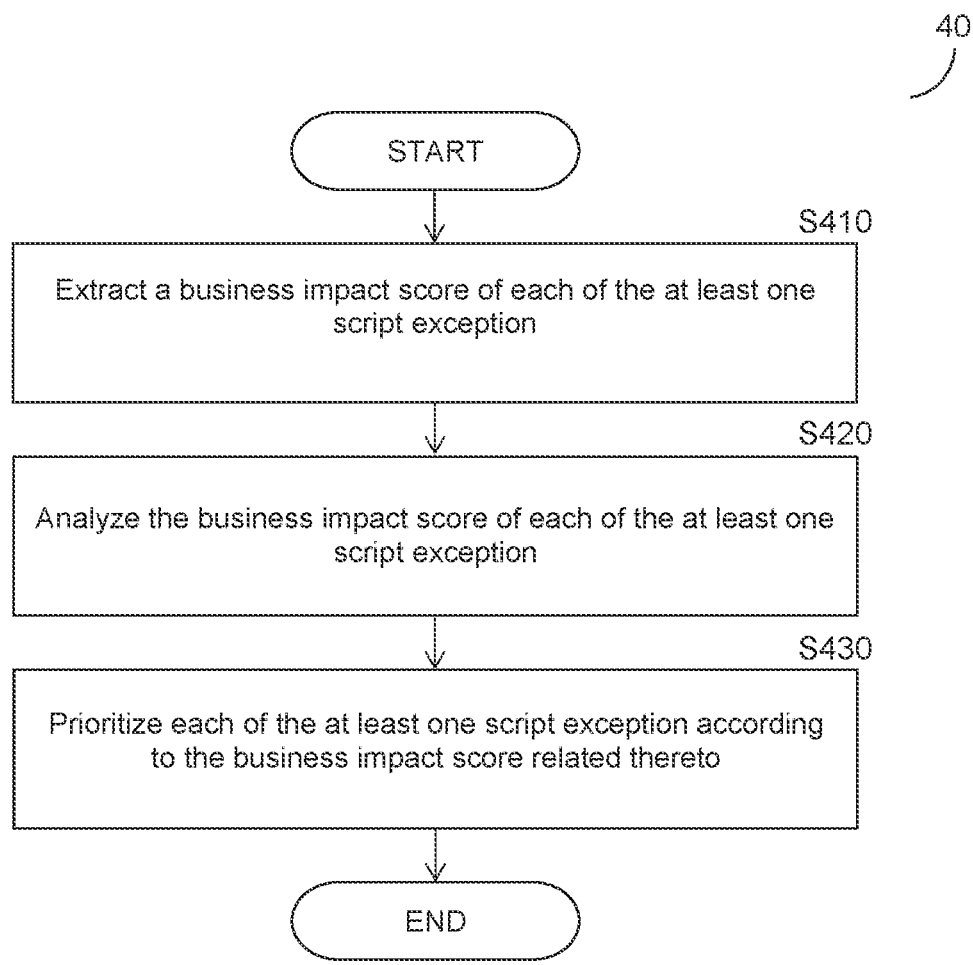
FIG. 4 is a flowchart illustrating a method for prioritizing script exceptions according to one embodiment.

FIG. 4 shows an example flowchart 400 illustrating a method for prioritizing script error exceptions (hereinafter referred to as "error exceptions"), according to one embodiment. In an embodiment, the method is performed by the analytic system 130.

At S410, a business impact score of each of the at least one script error exception is extracted from, for example, a database, such as the database 150, shown in FIG. 1.

At S420, the business impact score of each of the at least one error exception is analyzed. The analysis may include comparing all business impact scores to determine the priority.

At S430, each of the at least one error exception is prioritized according to the business impact score related thereto. That is, a first error exception, such as a script error indicating that a "buy" button is not working properly, may have a greater negative business impact than a second script error, such as a script error indicating that the company's logo is not displayed properly. For example, a first error exception for which a relatively high business impact score was determined may get a higher priority compared to a second error exception for which a relatively low business impact score was determined. It should be noted that it may be desirable to fix a first script error that causes damages to a website (i.e., from the perspective of a company that owns the website) before fixing a second script error that causes less damage than the first script error. Therefore, there is a need for prioritizing each of the at least one error exception according to its business impact score.

FIG. 5 is an example screenshot showing the displayed processed information on a first dashboard 500. The dashboard 500 summarizes the processed script error exceptions data. The dashboard includes a header in which a number of visits (e.g., 746,250) that were impacted by a number of script errors (e.g., 47) is indicated. The dashboard 500 further indicates that, over the last 30 days the 47 script errors occurred, in 21 URL's, in 37 pages, in two browsers, in one operating system (OS), in two type of devices, and in 87 countries. Below the header, a first left column depicts the errors' type, the following right column depicts the number of visits with errors, the next following right column depicts the number of lost conversions, the next following right column depicts the impact on a predetermined goal. One column before the last right column is a column that depicts a value that reflects the missed opportunity, such as how much money was lost due to a specific script error.

FIG. 6 is another example screenshot showing the displayed processed information on a second dashboard 600. The dashboard 600 indicates that over the last thirty days the total number of visits was 85,000, that the number of visits with errors was 31,000, that the number of lost conversions was 24,600, that the impact on the predetermined goal is four percent, and that the amount that reflects the money that was lost due to the script errors, such as missed opportunities, is USD $4,587. The dashboard 600 further indicates that, over the last thirty days, 1,588 visits were impacted by eight script errors. The dashboard 600 further includes that the columns that show detailed information regarding each type of error, such as the error name, the number of visits with error, the number of lost conversions, the impact on a predetermined goal, and missed opportunities.

Figure 7:
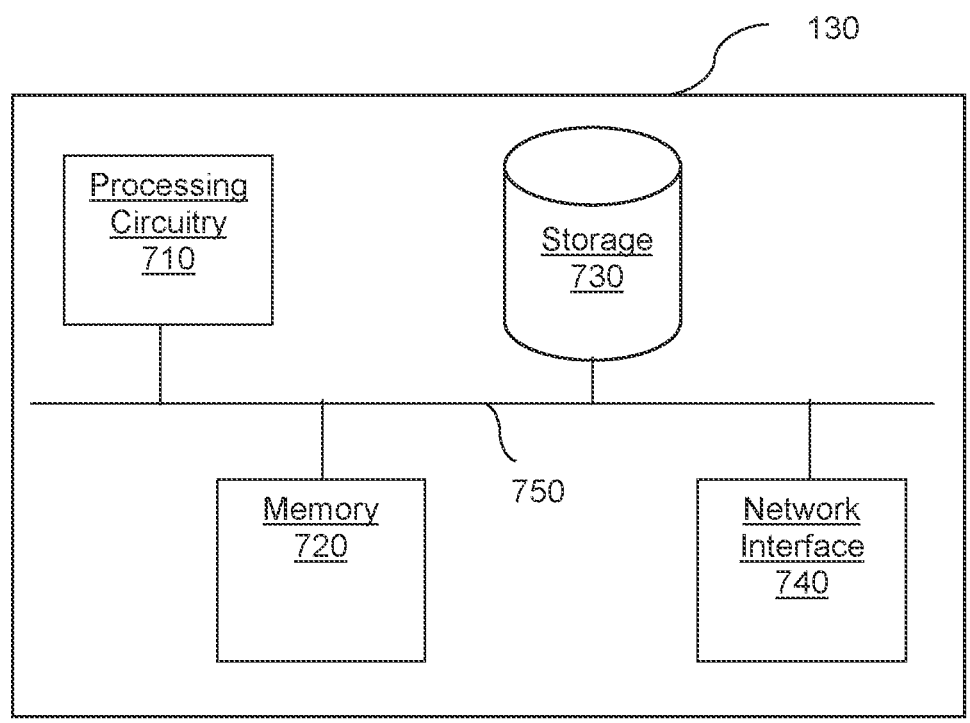
FIG. 7 is a block diagram of a system utilized to process and analyze script exceptions according to an embodiment.

FIG. 7 is an example schematic diagram of an analytic system 130, according to an embodiment. The analytic system 130 includes a processing circuitry 710 coupled to a memory 720, a storage 730, and a network interface 740. In an embodiment, the components of the analytic system 130 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile, such as random access memory (RAM), and the like, non-volatile, such as read only memory (ROM), flash memory, and the like, or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code, such as in source code format, binary code format, executable code format, or any other suitable format of code. The instructions, when executed by the processing circuitry 710, cause the processing circuitry 710 to perform the various processes described herein.

The storage 730 may be magnetic storage, optical storage, and the like, and may be realized, for example, as flash memory or another memory technology, compact disk-read only memory (CD-ROM), Digital Versatile Disks (DVDs), or any other medium which can be used to store the desired information.

The network interface 740 allows the analytic system 130 to communicate with the various components, devices, and systems described herein for the purpose of identifying and quantifying script errors, and for other, related, purposes.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

A person skilled-in-the-art will readily note that other embodiments of the disclosure may be achieved without departing from the scope of the disclosure. All such embodiments are included herein. The scope of the disclosure should be limited solely by the claims thereto.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A method comprising:
receiving from a first client device, webpage browsing data associated with a webpage accessed by a user of the first client device, wherein the webpage browsing data comprises a plurality of computer script error exceptions and user device interaction information associated with the webpage, the webpage browsing data received based on a tracking tag that causes a webpage browser to execute computer code to track the webpage browsing data;
determining a plurality of webpage metrics based on the user device interaction information;
for each computer script error exception of the plurality of computer script error exceptions,
retrieving a first value for a selected webpage metric of the plurality of webpage metrics, wherein the first value represents a value for the selected webpage metric during normal activity of the webpage,
retrieving a second value for the selected webpage metric, wherein the second value represents a value for the selected webpage metric during abnormal activity of the webpage,
determining a first score based on the first value and the second value, wherein the first score indicates an impact of each computer script error exception on the selected webpage metric of the webpage;
determining a second score based on the determined first score; and
prioritizing the plurality of computer script error exceptions based on the second score, the prioritizing indicating an importance of resolving the plurality of computer script error exceptions.

2. The method of claim 1,
wherein each computer script error exception of the plurality of computer script error exceptions is generated based on a plurality of errors that occurs in a computer script that runs on the webpage, and
wherein the selected webpage metric measures a performance impact of each error exception.

3. The method of claim 1, further comprising:
for each computer script error exception of the plurality of computer script error exceptions,
determining a value based on the second score for the selected webpage metric,
wherein the data based on the score comprises the second score or the first score.

4. The method of claim 3, further comprising:
causing a user interface to be displayed on a second client device, wherein the user interface comprises at least one of the plurality of computer script error exceptions and data based on the first score.

5. The method of claim 4, further comprising:
generating a report, the report comprising, for each computer script error exception of the plurality of computer script error exceptions, the second score, the value, the computer script error exception, or a combination thereof.

6. The method of claim 1, wherein the selected webpage metric comprises: a conversion rate, a click-through rate, a number of pageviews, or a cart abandonment.

7. The method of claim 1, further comprising:
receiving webpage browsing data from a third client device.

8. The method of claim 7, wherein the webpage browsing data is independently captured on each of the first client device and the third client device.

9. The method of claim 7, wherein the third client device did not encounter the plurality of computer script error exceptions, and wherein the first client device encounters the plurality of computer script error exceptions.

10. The method of claim 1, wherein determining the score further comprises:
determining a trend of the score.

11. A non-transitory computer readable medium having stored thereon instructions for causing a processing circuitry to perform operations comprising:
receiving from a first client device, webpage browsing data associated with a webpage accessed by a user of the first client device, wherein the webpage browsing data comprises a plurality of computer script error exceptions and user device interaction information associated with the webpage, the webpage browsing data received based on a tracking tag that causes a webpage browser to execute computer code to track the webpage browsing data;
determining a plurality of webpage metrics based on the user device interaction information;
for each computer script error exception of the plurality of computer script error exceptions,
retrieving a first value for a selected webpage metric of the plurality of webpage metrics, wherein the first value represents a value for the selected webpage metric during normal activity of the webpage,
retrieving a second value for the selected webpage metric, wherein the second value represents a value for the selected webpage metric during abnormal activity of the webpage,
determining a first score based on the first value and the second value, wherein the first score indicates an impact of each computer script error exception on the selected webpage metric of the webpage;
determining a second score based on the determined first score; and
prioritizing the plurality of computer script error exceptions based on the second score, the prioritizing indicating an importance of resolving the plurality of computer script error exceptions.

12. A system comprising:
a processing circuitry; and
a memory, the memory having instructions stored thereon that, when executed by the processing circuitry, cause the system to perform operations comprising:
receiving from a first client device, webpage browsing data associated with a webpage accessed by a user of the first client device, wherein the webpage browsing data comprises a plurality of computer script error exceptions and user device interaction information associated with the webpage, the webpage browsing data received based on a tracking tag that causes a webpage browser to execute computer code to track the webpage browsing data;
determining a plurality of webpage metrics based on the user device interaction information;
for each computer script error exception of the plurality of computer script error exceptions,
retrieving a first value for a selected webpage metric of the plurality of webpage metrics, wherein the first value represents a value for the selected webpage metric during normal activity of the webpage, retrieving a second value for the selected performance webpage metric, wherein the second value represents a value for the selected performance webpage metric during abnormal activity of the webpage, determining a first score based on the first value and the second value, wherein the first score indicates an impact of each computer script error exception on the selected webpage metric of the webpage;

determining a second score based on the determined first score; and prioritizing the plurality of computer script error exceptions based on the second score, the prioritizing indicating an importance of resolving the plurality of computer script error exceptions.

13. The system of claim 12, wherein the operations further comprise:

for each computer script error exception of the plurality of computer script error exceptions, determining a value based on the second score for the selected webpage metric, wherein the data based on the score comprises the second score or the first score.

14. The system of claim 13, wherein the operations further comprise:

causing a user interface to be displayed on a second client device, wherein the user interface comprises at least one of the plurality of computer script error exceptions and data based on the first score.

15. The system of claim 14, wherein the operations further comprise:

generating a report, the report comprising, for each computer script error exception of the plurality of computer script error exceptions, the second score, the value, the computer script error exception, or any combination thereof.

16. The system of claim 12, wherein the selected webpage metric comprises: a conversion rate, a click-through rate, a number of pageviews, or a cart abandonment.

17. The system of claim 12, wherein the operations further comprise:

receiving webpage browsing data from a third client device.

18. The system of claim 17, wherein the webpage browsing data is independently captured on each of the first client device and the third client device.

19. The system of claim 12, wherein each computer script error exception of the plurality of computer script error exceptions is generated based on a plurality of errors that occurs in a computer script that runs on the webpage, and wherein the selected webpage metric measures a performance impact of each computer script error exception.

20. The system of claim 12, wherein the operations further comprise:

determine a trend of the score.

* * * * *

UNITED STATES PATENT AND TRADEMARK OFFICE
CERTIFICATE OF CORRECTION

PATENT NO. : 11,836,666 B2
APPLICATION NO. : 17/716650
DATED : December 5, 2023
INVENTOR(S) : Ali-Firat Kilic It is certified that error appears in the above-identified patent and that said Letters Patent is hereby corrected as shown below:

On the Title Page

In Column 2, under "Other Publications", Line 1, delete "inplication" and insert --Implications-- therefor In the Drawings Sheet 2 of 7, Fig. 2, reference numeral 20, Line 1, delete "20" and insert --200-- therefor On sheet 3 of 7, Fig. 3, reference numeral 30, Line 1, delete "30" and insert --300-- therefor On sheet 4 of 7, Fig. 4, reference numeral 40, Line 1, delete "40" and insert --400-- therefor On sheet 5 of 7, Fig. 5, reference numeral 50, Line 1, delete "50" and insert --500-- therefor On sheet 6 of 7, Fig. 6, reference numeral 60, Line 1, delete "60" and insert --600-- therefor In the Claims In Column 11, Line 63, in Claim 6, after "comprises:", insert a linebreak In Column 13, Line 1, in Claim 12, after "selected", delete "performance"

In Column 13, Line 3, in Claim 12, after "selected", delete "performance"

In Column 14, Line 9, in Claim 16, after "comprises:", insert a linebreak

Signed and Sealed this
Nineteenth Day of November, 2024

Katherine Kelly Vidal
*Director of the United States Patent and Trademark Office*